UNITED STATES PATENT OFFICE 2,285,647

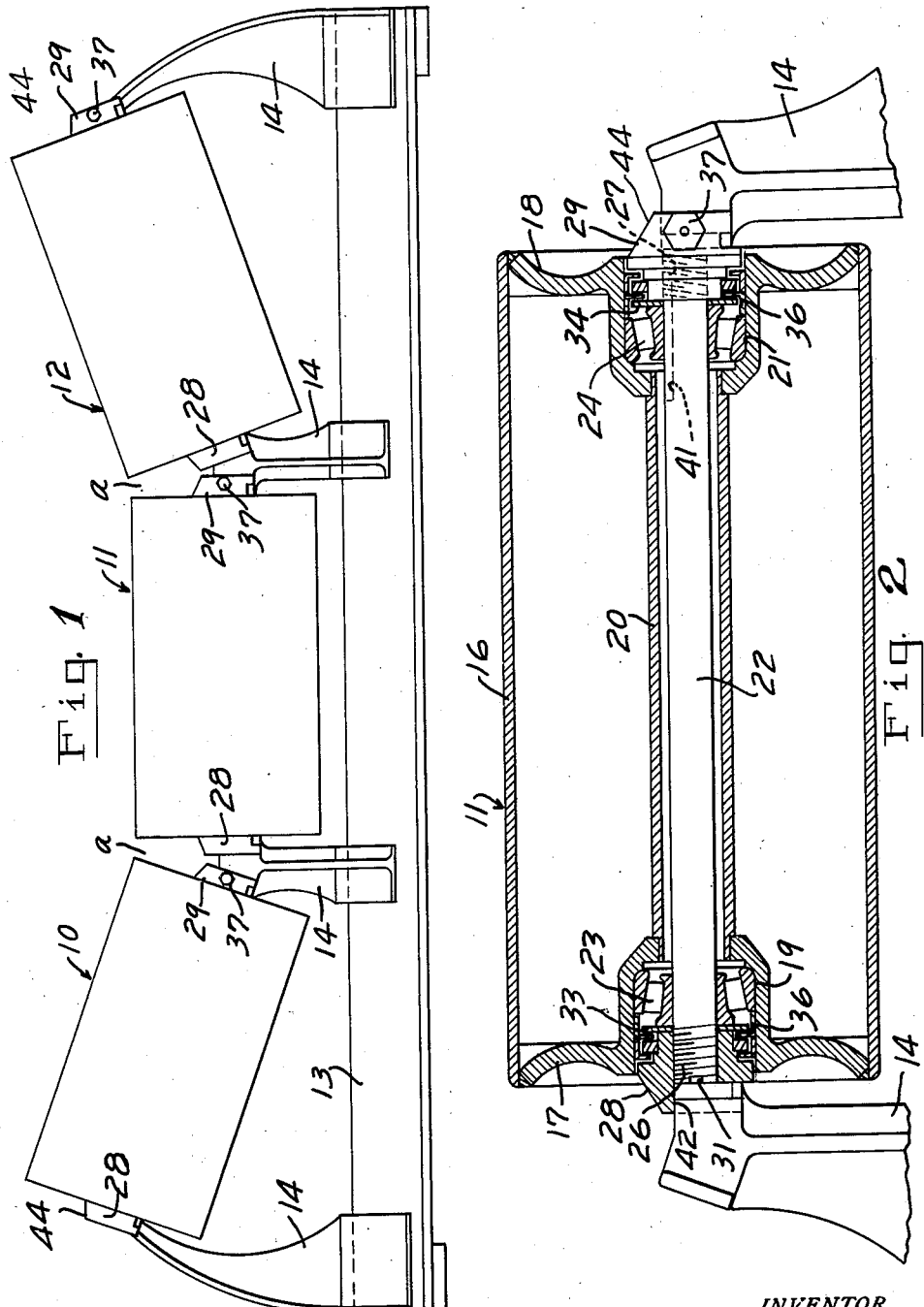

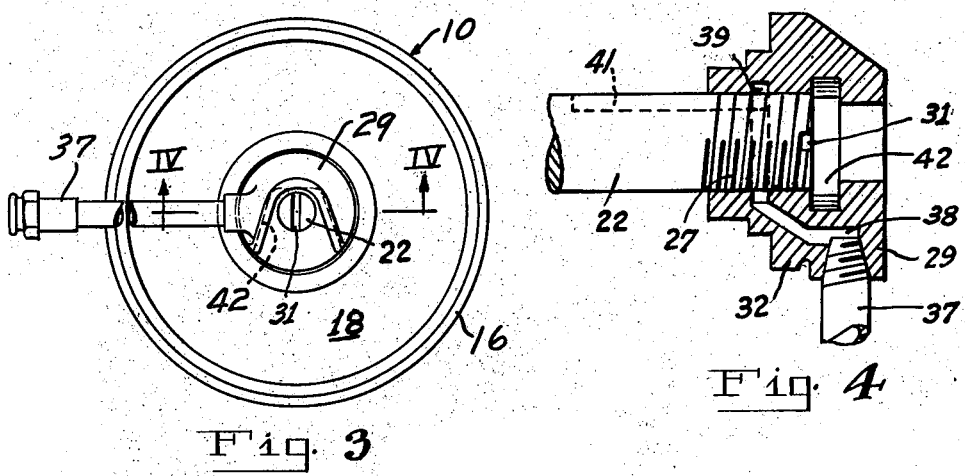
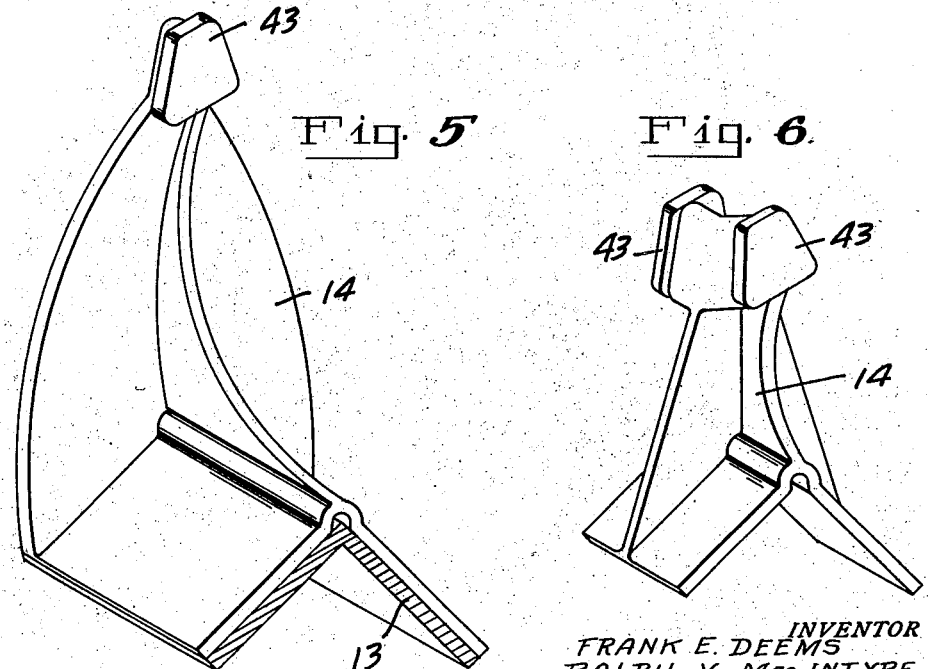

BELT CONVEYER SUPPORTING ROLL

Frank E. Deems, Ralph Y. MacIntyre, Mark S. Greeley and George R. Fisk, Birmingham, Ala., assignors to Continental Gin Company, a corporation of Delaware Application August 4, 1940, Serial No. 351,396

6 Claims. (Cl. 308—20)

Our invention relates to the supporting rolls for belt conveyers of the trough type, and has for some of its objects the provision of a roll assembly which shall be simple of design and easily assembled, and which shall provide a positive positioning of the rolls, coupled with easy removal of any roll from the assembly, a minimum clearance between adjacent rolls, and means to shed material which might otherwise accumulate, causing friction or interfering with the rotating parts.

A further object of our invention is to provide a roll shaft and adjusting nuts cooperating therewith which shall provide a ready means for mounting a roll on its support so that it is held against lateral and endwise movement, and which also seats and holds the bearings in place and provides a ready means for lubricating the bearings.

A still further object of our invention is to provide improved supporting brackets for the rolls which are adapted to cooperate with the adjusting nuts to hold the rolls against movement laterally or endwise and which permit easy removal of a roll assembly from the support.

Apparatus embodying features of our invention is illustrated in the accompanying drawings forming a part of this application, in which—

Fig. 1 is an elevational view of an idler roll assembly embodying features of our invention;

Fig. 2 is a sectional view of one of the idler rolls and the adjusting nuts;

Fig. 3 is an end view of a roll removed from its support;

Fig. 4 is a sectional view drawn to a larger scale and taken along the line IV—IV of Fig. 3; and Figs. 5 and 6 are perspective views of supporting brackets for our improved roll assembly.

Referring to the drawings for a better understanding of our invention, we show idler rolls 10, 11 and 12 supported from a frame member 13 by a plurality of brackets 14 mounted on the frame member. Each of the rolls comprises a cylinder 16 having dished heads 17 and 18 having bearing recesses 19 and 21 therein which are connected by a spacer and grease tube 20. The rolls may be made with a cylindrical shell with the heads welded in, as shown in Fig. 2, or they may be cast in one piece, or made in any other suitable manner, as is well understood. Extending through the roll is a shaft 22. Surrounding the shaft 22, near each end and positioned in the bearing recesses 19 and 21, are anti-friction bearings 23 and 24. The shaft 22 on one end, as at 26, is provided with left hand threads, and on the other, at 27, with right hand threads. Adjusting nuts 28 and 29 having corresponding threads are mounted on the ends of the shaft to hold the bearings in place and to support the rolls, as soon to be described. The end of the shaft 22 is provided with a kerf 31, into which a tool may be inserted through the open end of the nut 28 to position the nuts 28 and 29 on the shaft and in the bearing recesses.

Each of the nuts 28 and 29 is provided with a shoulder 32 which acts as a closure for the outer end of the adjacent recess. The nuts, when tightened up, bear against washers 33 and 34, which press against the adjacent bearings and hold them in place in their recesses. Interposed between the washers 33 and 34 and the outer end of each of the recesses are labyrinth rings 36 to prevent the escape of lubricant. The nut 29 is supplied with a pressure lubricant fitting 37 in the side thereof as shown in Figs. 2 and 4, no higher than the long axis of the nut, and there is formed in the nut 29 a passage 38 leading from the connection 37 to an annular groove 39 surrounding the shaft 22. See Fig. 4. Near the end of the shaft 22 is provided a grease passage 41 with which the groove 39 communicates so that lubricant supplied through the connection 37 passes through the passage 38, groove 39, and grease passage 41, into the grease tube 20, from which it is free to pass into the bearings 23 and 24.

In the outer end of each of the nuts 28 and 29 there is provided a downwardly opening divergent socket 42 which is somewhat in the shape of an inverted U, as seen in Fig. 3. Formed integrally with the supporting bracket 14 is a head 43 of a shape corresponding to the socket 42. The socket 42 fits snugly over a head 43 on its associated supporting bracket 14. Being downwardly opening, no abrasive material can get into the socket, and being divergent, it is self tightening and the roll can be readily removed from the supporting bracket. As will be seen by reference to Figs. 5 and 6, the heads 43 are disposed at the proper angles to accommodate the sockets in the nut to be engaged, and intermediate brackets are provided with the heads 43, one to support the adjacent end of each roll. The outer ends of the adjusting nuts 28 and 29 are each provided with a downwardly sloping surface 44 to aid in shedding any material which may fall through the conveyer.

As hereinbefore indicated, in assembling our improved idler rolls, the shaft bearings and labyrinth packings are positioned in the recesses and the nuts 28 and 29 held in their proper positions while a tool inserted through the open end of the nut 28 engages the shaft 22 in the kerf 31 and is employed to turn the shaft 22 and tighten the nuts in their proper relation on the shaft and in the recesses. Each roll is mounted on the supporting bracket 14 by placing the sockets 42 in the ends of the nuts 28 and 29 over the heads 43 of the supporting brackets. The brackets 14 are of unitary construction and are rigidly secured to the frame member 13, preferably by welding. As will be seen by reference to Figs. 2 and 4, the ends of the shaft 22, when mounted in place abut against the bracket heads 43 in the sockets 42. The rolls when thus mounted on the rigid supporting brackets can not move laterally, and are positively positioned against any endwise movement. This structure provides for a minimum clearance, as at $a$, between adjacent rolls without danger of pinching the conveyer belt in operation. The adjusting nuts, having a fixed angular position with respect to their supporting brackets, are designed to shed any foreign material which may be handled by the conveyer, and also provide a ready means for supplying lubricant to the bearings.

From the foregoing it will be apparent that we have devised an improved supporting roll assembly which is simple of design, sturdy of construction, easily assembled, and which provides a positive positioning of the rollers and operates with a minimum of friction or interference with rotating parts.

While we have shown our invention in but one form, it will be obvious to those skilled in the art that it is not so limited, but is susceptible of various changes and modifications, without departing from the spirit thereof, and we desire, therefore, that only such limitations shall be placed thereupon as are imposed by the prior art or as are specifically set forth in the appended claims.

What we claim is:

1. In a supporting roll assembly for a belt conveyer, the combination with a roll embodying roll heads having bearing recesses therein and a shaft extending through the roll and recesses and having a grease passage therein communicating with the recesses, and bearings cooperating with the shaft and the recess walls, of a supporting nut on each end of the shaft adapted to hold the bearings in place having a downwardly opening socket therein closed at its upper end, and a bracket having a head over which the socket fits.

2. In a supporting roll assembly for a belt conveyer, the combination with a roll embodying roll heads having bearing recesses therein and a shaft extending through the roll and recesses and having a grease passage therein communicating with the recesses, and bearings cooperating with the shaft and the recess walls, of a supporting nut on each end of the shaft adapted to hold the bearings in place having a downwardly opening socket therein closed at its upper end, a bracket having a head over which the socket fits, and a lubricant fitting in the side of the nut no higher than the long axis thereof, there being a lubricant passage in the nut communicating with that of the shaft.

3. In a supporting roll assembly for a belt conveyer, the combination with a roll embodying roll heads having bearing recesses therein and a shaft extending through the roll and recesses and having a grease passage therein communicating with the recesses, and bearings cooperating with the shaft and the recess walls, of a supporting nut on each end of the shaft adapted to hold the bearings in place having a downwardly opening socket therein closed at its upper end, a bracket having a head over which the socket fits, and a downwardly sloping upper surface on the supporting nut providing positioning at increased angular relation with respect to adjacent rolls.

4. In a supporting roll assembly for a belt conveyer, the combination with a roll embodying roll heads having bearing recesses therein and a shaft extending through the roll and recesses and having a grease passage therein communicating with the recesses, and bearings cooperating with the shaft and the recess walls, of a supporting nut on each end of the shaft adapted to hold the bearings in place having a downwardly opening socket therein closed at its upper end, a bracket having a head over which the socket fits, a downwardly sloping upper surface on the supporting nut providing positioning at increased angular relation with respect to adjacent rolls, and a lubricant fitting in the side of the nut no higher than the long axis thereof, there being a lubricant passage in the nut communicating with that of the shaft.

5. In a supporting roll assembly for a belt conveyer, the combination with a roll embodying roll heads having bearing recesses therein and a shaft extending through the roll and recesses and having a grease passage therein communicating with the recesses, and bearings cooperating with the shaft and the recess walls, of a supporting nut on each end of the shaft adapted to hold the bearings in place and having a downwardly opening socket therein closed at its upper end, the shaft terminating at the socket, a bracket having a head fitting into the socket and bearing against the end of the shaft, and means to supply lubricant through the side of one of the nuts to the bearings.

6. In a supporting roll assembly for a belt conveyer, the combination with a roll embodying roll heads having bearing recesses therein and a shaft extending through the roll and recesses and having a grease passage therein communicating with the recesses and bearings cooperating with the shaft and the recess walls, of a supporting nut on each end of the shaft adapted to hold the bearings in place and having a downwardly opening socket therein closed at its upper end, the shaft terminating at the socket, a bracket having a head fitting into the socket and bearing against the end of the shaft, each of said nuts sloping upwardly from the bracket to shed material falling thereon, and means to supply lubricant through the side of one of the nuts to the bearings.

FRANK E. DEEMS.
RALPH Y. MacINTYRE.
MARK S. GREELEY.
GEORGE R. FISK.